Sept. 25, 1928.  1,685,235
H. E. KEMPTON ET AL
CHUCK
Filed July 2, 1924
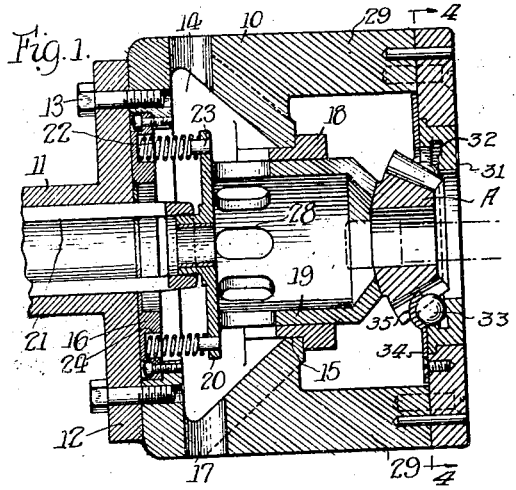
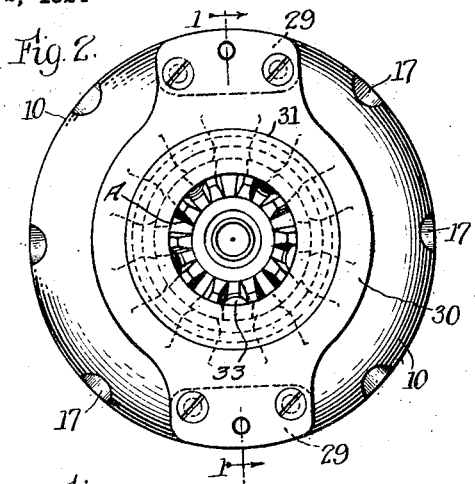
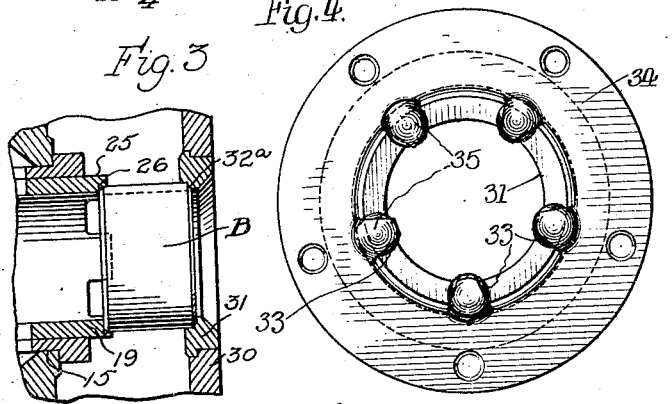
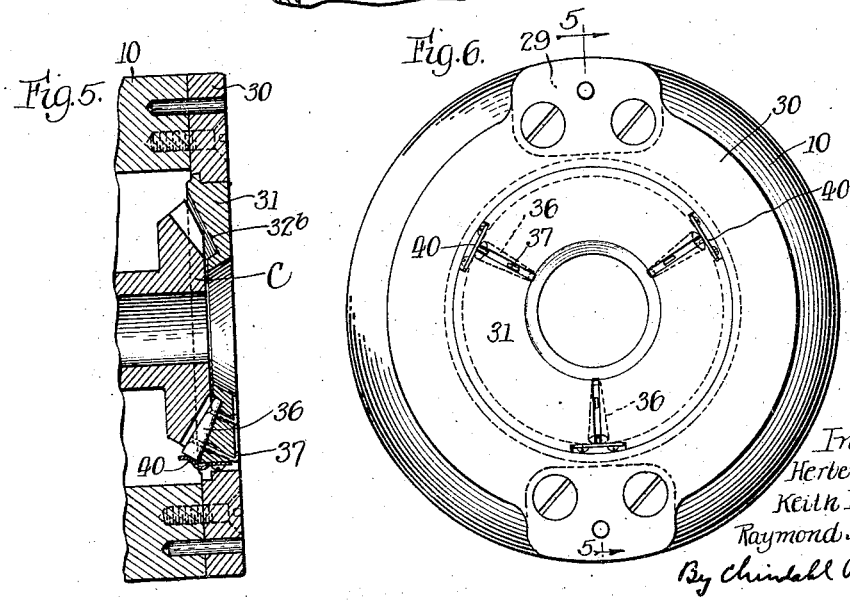
Inventors:
Herbert E. Kempton,
Keith F. Gallimore,
Raymond M. Woytych, Patented Sept. 25, 1928.

1,685,235

UNITED STATES PATENT OFFICE.

HERBERT E. KEMPTON, KEITH F. GALLIMORE, AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

CHUCK.

Application filed July 2, 1924. Serial No. 723,661.

Our invention relates to improvements in chucks, and has particular reference to chucks adapted for use in internal grinding machines.

One of the objects of our invention is to provide a chuck of simple and inexpensive construction which is efficient and precise in use, and which does not readily clog with abrasive matter or other refuse thrown off in the machine operation.

Another object is to provide a chuck having improved means for accurately and quickly centering gears and clamping them rigidly in centered position.

Further objects and advantages will become apparent as the description proceeds.

In the accompanying drawings, Figure 1 is a longitudinal section taken along line 1—1 of Fig. 2 of a chuck constructed according to our invention.

Fig. 2 is an end view thereof.

Fig. 3 is a fragmentary section of a chuck similar to that shown in Fig. 1 provided with a modified form of work centering means.

Fig. 4 is a rear or inside view of the centering means shown in Fig. 1.

Fig. 5 is a fragmentary section taken along line 5—5 of Fig. 6 of a chuck provided with a modified form of work centering means.

Fig. 6 is an end view of the construction shown in Fig. 5.

While we have shown in the drawings, and will herein describe in detail the preferred embodiment of our invention, it is to be understood that we do not thereby intend to limit the same to the construction disclosed, but aim in the appended claims to cover all modifications and alternative constructions falling within the spirit and scope of the invention.

In the exemplary embodiment of our invention, 10 represents the chuck body, and 11 designates a hollow rotatable work spindle having a flange 12 to which the body 10 can be secured by any suitable means, such as tap screws 13. The body 10 in the present instance is formed with a rear chamber 14 opening to the front through an axial bore 15, and being partially closed at the rear by an annular plate 16. A plurality of clearance passages 17 extending through the side walls of the chamber 14 serve as a means for conducting away any refuse thrown off in the machine operation.

Positioned in the bore 15 is a bushing 18 in which a hollow cylindrical clamping member or sleeve 19 is slidably mounted. The rear end of the member 19 is formed integral with a disk 20 which is secured to any suitable retracting means, such as the draw bar 21. A plurality of coiled springs 22, the forward ends of which fit over pins 23 on the disk 20, and the rear ends of which fit into depressions 24 in the plate 16, serve to move the clamping member 19 forward when the draw bar 21 is released.

The body 10 is provided with oppositely positioned and forwardly extending arms 29 to the outer ends of which a front plate 30 is secured. Mounted in the plate 30 concentric with the axis of rotation is a bushing 31 having an annular notch 32.

The notch 32 constitutes a raceway for a plurality of balls or rollers 33 which are arranged to engage the bevel gear A between the teeth. The balls 33 are held rotatably in place by a retainer 34 which comprises an annular plate secured to the inside of the front plate 30, and having a plurality of radial arms 35 shaped to fit over said balls. Where the rear face of the work blank A is inclined as in this case, the front end of the clamping member 19 is constructed to conform to the end of the blank.

In Fig. 3, we have shown a modified form of centering means for holding cylindrical work blanks B. The front end of the clamping member 19 is provided with a plurality of peripherally spaced arms 25 having an inner notch 26 to receive the rear end of the work blank B. The front end of the work blank engages in an annular notch 32ª in the bushing 31. Refuse from the machine operation passes from the interior of the member 19 through the spaces between the arms 25 and through a plurality of clearance openings 28.

In Figs. 5 and 6 we have shown a modified form of the centering means for bevel gears. Here the bushing 31 is formed with a conical notch 32ᵇ. A plurality of taper pins 36 adapted to fit between the teeth of the gear blank C are radially positioned in the notch 32ᵇ and are secured to the bushing 31 by any suitable means, such as wires 37. Leaf springs 40 secured to the bushing 31 overlap with the outer ends of the taper pins 36 to hold them against outward movement.

It will be apparent that by releasing the draw bar 21, the sleeve 19 will engage the work blank to square it up against the balls 33 or taper pins 36, and that they will serve to accurately center the blank in the chuck. Gear blanks can thus be quickly and accurately chucked without injury to their teeth.

We claim as our invention:

1. A chuck having, in combination, a body formed with a chamber and with an axial bore opening from the front into said chamber, the peripheral wall of said chamber being formed with a plurality of clearance passages, a bushing mounted in said bore, a front plate mounted on said body in parallel spaced relation to said bushing, a cylindrical sleeve slidably mounted in said bushing and substantially closed at its rear end, the front end of said sleeve being adapted to engage the work to clamp the latter against said front plate and the rear end of said sleeve extending into said chamber and having a plurality of clearance passages in its peripheral wall opening into said chamber, and spring means in said chamber engaging the inner end of said sleeve.

2. A chuck having, in combination, a body formed with a chamber and with an axial bore opening from the front into said chamber, the walls of said chamber being formed with clearance passages, a front plate mounted on said body, a clamping sleeve slidably mounted in said bore for movement toward and from said plate to clamp or release the work, the rear end of said clamping sleeve extending into said chamber, having a disk closing same and having a plurality of clearance passages opening into said chamber, a plate partially closing the rear of said chamber, a plurality of springs interposed between said last mentioned plate and said disk and tending to move said sleeve forwardly, and means for moving said sleeve rearwardly.

3. A chuck comprising, in combination, a body provided with a front plate having a central axial bore, a bushing mounted in said bore and having an annular notch formed in its inner peripheral edge, a plurality of balls rotatably mounted in said notch, a retaining plate secured to the inner surface of said front plate and having a plurality of curved arms extending radially into engagement with said balls to hold the latter in position, and clamping means mounted in said body for movement toward and from said face plate.

4. A chuck having, in combination, a body provided with a front plate having a central axial bore, a bushing mounted in said bore and having an annular raceway in its inner surface, a plurality of balls mounted in said raceway, means for holding said balls in position, and clamping means slidably mounted in said body for movement toward and from said front plate.

5. A chuck having, in combination, a body provided with a pair of forwardly extending arms, a front plate secured to the front ends of said arms and having a central axial opening, a peripheral notch formed in the inner edge of said opening, a plurality of balls mounted in spaced relation in said notch, means for holding said balls in position, clamping means mounted in said body in cooperative relation with said balls to center and clamp a work blank in centered position.

6. A chuck having, in combination, a chuck body, a front plate provided by said body, said front plate having a central axial bore, hollow guiding means in said body having an interior cylindrical surface coaxial with said bore, a clamping member in the form of a sleeve longitudinally movable in said guiding means, spring means to normally force said clamping member towards said front plate, and a draw bar for drawing said clamping member away from said front plate.

In testimony whereof we have hereunto affixed our signatures.

HERBERT E. KEMPTON.
KEITH F. GALLIMORE.
RAYMOND M. WOYTYCH.